(12) United States Patent
Kogan et al.

(10) Patent No.: US 7,712,087 B2
(45) Date of Patent: May 4, 2010

(54) METHODS AND SYSTEMS FOR IDENTIFYING INTERMITTENT ERRORS IN A DISTRIBUTED CODE DEVELOPMENT ENVIRONMENT

(75) Inventors: David Kogan, San Mateo, CA (US); John R. Ciminski, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1136 days.

(21) Appl. No.: 11/169,455

(22) Filed: Jun. 28, 2005

(65) Prior Publication Data
US 2007/0011541 A1 Jan. 11, 2007

(51) Int. Cl.
*G06F 9/44* (2006.01)
(52) U.S. Cl. .................. 717/131; 717/128; 717/129; 717/130
(58) Field of Classification Search .................. None
See application file for complete search history.

(56) References Cited

U.S. PATENT DOCUMENTS

| | | | |
|---|---|---|---|
| 5,182,806 A | | 1/1993 | McKeeman et al. |
| 5,278,979 A | | 1/1994 | Foster et al. |
| 5,768,591 A | | 6/1998 | Robinson |
| 6,275,223 B1 | | 8/2001 | Hughes |
| 6,378,087 B1 | * | 4/2002 | Flanagan et al. ............... 714/38 |
| 6,513,154 B1 | | 1/2003 | Porterfield |
| 6,748,582 B1 | | 6/2004 | Chiles et al. |
| 2005/0166094 A1 | * | 7/2005 | Blackwell et al. ............. 714/38 |
| 2006/0041864 A1 | * | 2/2006 | Holloway et al. ........... 717/124 |

OTHER PUBLICATIONS

Barbara Assadi, "The Making of Oracle Database 10g", http://www.oracle.com/technology/oramag/ oracle/03-sep/o53making10g.html, printed Apr. 27, 2005, 6 pages.

Jacky Estublier, "Software Configuration Management: A Roadmap", Dassault Systemes / LSR, Grenoble University, Bat C, BP 53, 38041 Grenoble 9 France, Jacky.Estublier@imag.fr, 9 pages.

(Continued)

*Primary Examiner*—Chuck O Kendall
(74) *Attorney, Agent, or Firm*—Townsend and Townsend and Crew LLP (57) ABSTRACT

A distributed code development environment includes baseline code that is logically divided into a plurality of labels, each including a plurality of transactions authored by respective developers. A computer-implemented method for identifying intermittent errors in the baseline and determining whether errors generated by a test of transactions are intermittent or consistent may include steps of providing the baseline code and providing the plurality of transactions, each of the plurality of transactions including code authored by a developer. A selected test may be carried out on a selected one of the plurality of transactions, the selected test generating an error that represents an unsuccessful completion of the selected test. The generated error may then be compared against errors generated by the selected test on other transactions or labels. The generated error may be identified as intermittent with respect to the transaction and spurious in the baseline if a selected number of errors generated by the selected test on the other transactions or labels are identical or similar to the generated error, according to a selected metric.

21 Claims, 5 Drawing Sheets

OTHER PUBLICATIONS

Karol Fruhauf and Andreas Zeller, "Software Configuration Management: State of the Art, State of the Practice", INFOGEM AG and Universitat Passau, 11 pages.

Washington State University, "Source Configuration Management", http://eecs.wsu.edu/=cs224/notes/scm.html, printed Apr. 5, 2005, 4 pages.

United States Department of Energy, Albuquerque Operations Office, Department of Energy Quality Managers Software Quality Assurance Subcommittee Reference Document SQAS20.01.00—2000, "Softward Configuration Managment (SCM) A Practical Guide", Apr. 2000.

United States Airforce Software Technology Support Center Technology Report, "Software Configuration Management Technologies and Applications", 46 pages.

* cited by examiner

METHODS AND SYSTEMS FOR IDENTIFYING INTERMITTENT ERRORS IN A DISTRIBUTED CODE DEVELOPMENT ENVIRONMENT

BACKGROUND OF THE INVENTION

1. Field of the Invention

Embodiments of the present invention relate to the field of source code management. More particularly, embodiments of the present invention relate to methods and systems for identifying intermittent errors in a distributed source code development environment and related mechanisms to improve developers' efficiency and product quality.

2. Description of the Prior Art and Related Information

Figure 1:
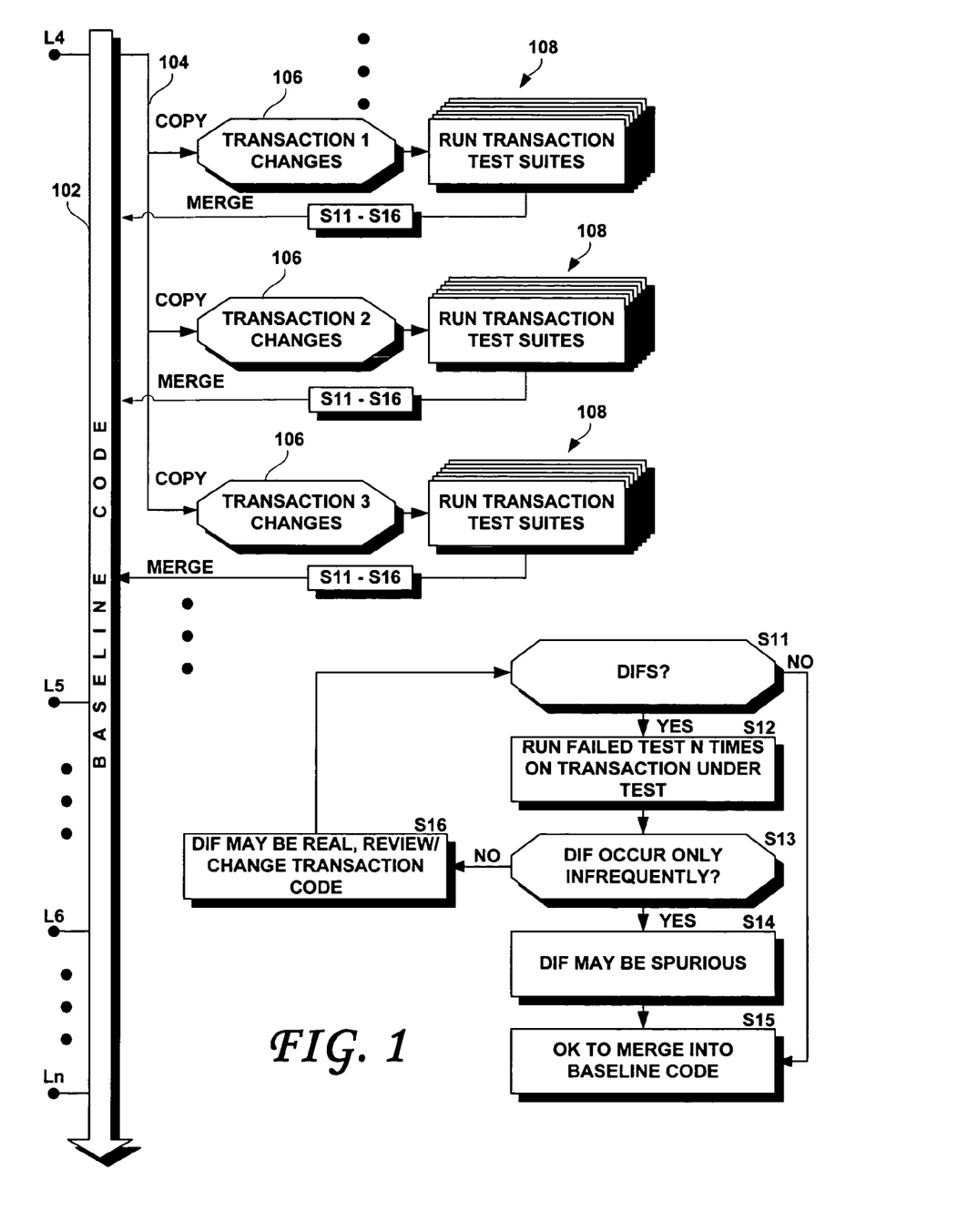
FIG. 1 is a representation of the baseline code over time and conventional methods of testing transactions.

It is now common for a number of developers to work on a single set of code. Typically, developers make a copy of all or a portion of the baseline code, shown at 102 in FIG. 1. Changes are made to the copy of the baseline code, which is now termed a transaction, as shown at 106. All transactions (transactions 1-3 being shown in FIG. 1) may be merged into the baseline code 102 when completed. This is typically the manner in which large coding projects incrementally update the baseline code. The baseline code 102, updated by the transactions merged therein over a given interval (e.g., a day) may be called a label. Labels L4 through Ln are shown in FIG. 1. A label may be thought of as a snapshot in time of the baseline code. These labels are in turn the incarnations of the baseline code used to start transactions as explained above. To minimize errors being introduced, developers run tests 108 on their individual transactions before merging the transactions into the baseline code 102. The baseline code 102, in turn, is also tested regularly. Both transactions and labels are tested using many test suites, each of which may include hundreds or thousands of individual tests. Such tests are called regression tests and it is not uncommon for a label to be tested nightly by using more than 100,000 regression tests running on over 1,000 servers. For large and complex code development projects, such testing may be carried out by a farm of hundreds or thousands of computers. The testing may also be carried out using the developers' individual computing power to harness the power of grid computing. This allows many tests to be run simultaneously on many machines.

In a typical scenario, tests are run nightly on both the transactions and the labels (if such labels have been defined, which is not necessary) and when the developers return to the office the next morning, they review the results of the tests that they ran the previous night. The results provide a basis for quality comparison between a transaction shown at 202 and the label used to begin it. The desired goal is to not have transactions adversely affect the quality of the baseline code when they are merged. A success (commonly referred to as a 'suc') returned by a given test means that the code is behaving as expected and has successfully passed the test. An error or a difference (commonly referred to as a 'dif') means that something is broken in the code and that there is a difference between the actual and expected outcome of the test. Difs may be identified by the size of the error text file output by the regression test. Difs may also be identified in many other ways, such as hashes, text string comparisons, for example. The file size is but one of many possible metrics.

There are two scenarios of interest. The first scenario occurs when a developer is working with a single set of code; and the second scenario occurs when a developer is working with two sets of code where one is based on the other. Within the first scenario, the following nomenclature applies: a 'dif' is an error; a 'suc' is a success, a 'consistent dif' is a dif that is consistently reproduced within the code upon testing and an 'intermittent dif' is a dif that sometimes occurs within the code and sometimes does not. Within the second scenario, the relevant information relates to the differences between the two sets of code (e.g., A and B, or the new and the old) and the following nomenclature may be established: a 'new dif' is a dif that occurred when running a test T on B but not on A (or occurred differently on A); a 'spurious dif' is a new dif that is not caused by the code differences between B and A (instead, the dif may have occurred because the error is intermittent in A and therefore in B, or caused by the environment differences, etc), and a 'real dif' is a new dif that is caused by the code differences between B and A. So, if B is a transaction built on top of A, a 'real dif' would be a dif introduced by the transaction.

Intermittent problems are significant problem: they are the hardest to solve, and so tend to account for many of the errors in the baseline. Intermittent difs encountered in testing a transaction may be caused by errors in the transaction code or in the baseline code. Further, intermittent difs may also be caused by factors that are external to and independent of the code. Such factors generally relate to the prevailing conditions within the environment (e.g. server, server farm, grid computing network) when the regression tests are run. These prevailing conditions may include noise, disk full conditions, timeouts caused by a lack of sufficient CPU cycles, to name only a few examples. Not only are intermittent difs difficult to solve, but they are also difficult to identify. For example, a developer may run a test on a transaction over and over again, to determine whether a dif re-occurs each time the test is run or whether it re-occurs not at all or only a limited number of times. There are, however, several problems associated with this code development scheme. For example, the time required to run the large numbers of test suites on a transaction is often longer than the time necessary to make the code changes. When a new dif is identified, as shown at step S11, the cause may be faulty code within the transaction, an intermittent problem with the transaction or label, an intermittent problem with the test, or a problem with the difference between the baseline run and a transaction run, as they may not be treated identically by the testing mechanism—for example, a transaction may include debugging data in the code, which the baseline lacks. The developer may examine each such error (which takes a large amount of time), or, more likely, rerun the failing tests as shown at S12 in the hope that the failed test will now succeed (match the results of the baseline label run). Re-running the test can be wasteful of both time and computing resources and may cause delays not only in the merging the transaction into the baseline code if there are no problems found, but also will cause delays in the resolution of real difs (errors introduced by the transaction) due to the delay of identifying them as real. If the dif is not re-observed upon repeating the test or if the dif is only re-observed a small number of times as shown at S13, the dif may be characterized as being intermittent in nature, and thus classified as spurious. Alternatively, it may be determined that the dif is consistent and the developer should review and debug his or her code, as indicated at S16. If, after running the regression test multiple times, it is determined that the dif is spurious in nature as shown at S14, the transaction with the spurious dif may be merged into the baseline code as shown at S15, with the expectation that the transaction's code changes are not faulty, but rather that either the baseline code or the environment is the cause of the dif. However, running these transaction and/or label tests over and over again is wasteful in both time and computing resources, as the underlying transaction could have been merged into the baseline code much earlier. In turn, the developer could have pushed ahead with code development, instead of wasting valuable time and computing resources determining whether the difs are real or spurious. Further, this approach will cause the developer to ignore an intermittent dif introduced by his or her transaction, thereby introducing an error into the baseline code. Alternatively, instead of running the regression tests over and over again, the developer may choose to examine the transaction code manually in an attempt to determine whether the difs are related to the code changes or instead are related to factors external to the transaction code. This, however, can waste a great deal of developer time, as there are commonly dozens or hundreds of difs to be examined.

The baseline code, moreover, has its own errors that must be resolved. The mechanism for finding such errors is generally based on a single run of every test for each new label of the baseline. This does not address intermittent errors, which are frequently discovered long after the error was introduced, when a run happens to encounter the problem. At that point, finding the cause and assigning the error is difficult.

Conventionally, there is no well defined way of dealing with intermittent difs when they are encountered in a label of the baseline code. Because such errors are not encountered in every label, it is normally impossible to tell which transaction introduced the error, and a judgment call must be made as to which developer to task with the resolution of the dif. This makes resolution of the problem extremely difficult for the developers, as there is no way to tell which code changes are related to the error. Because of the time it takes to find, assign, and resolve such issues, intermittent difs may persist in the baseline for months at a time. The baseline code is tested a limited number of times and such limited testing may overlook intermittent difs for a long time, and subsequently the errors take a long time to fix.

From the foregoing, it may be appreciated that there is a need for improved methods and systems for identifying intermittent difs so as to be able to ignore spurious difs encountered in transaction testing and resolve intermittent errors in the baseline code. Preferably, such methods and systems should make this determination in a manner that is economical in terms of both time and computing resources, and that allow developers to spend more of their time developing code and less of it testing and characterizing difs generated by testing suites.

SUMMARY OF THE INVENTION

In a distributed code development environment that includes baseline code that includes a plurality of transactions authored by respective developers, an embodiment of a computer-implemented method for determining whether errors generated by a test of software code are spurious or real may include a step of carrying out a selected test on a selected one of the plurality of transactions, the selected test generating an error that represents an unsuccessful completion of the selected test. It may then be verified that the generated error is not a known issue. The generated error may then be compared against errors generated by the selected test on a selected number of the plurality of transactions. The generated error may then be identified as spurious if a selected number of errors generated by the selected test on the selected number of transactions are identical or similar by a selectable metric to the generated error, and the generated error may be identified as real otherwise.

According to further embodiments, the baseline code may be logically divided into a plurality of labels, each of the plurality of labels including a plurality of transactions. The verifying step may include comparing the generated error against the result of the selected test on at least one of the plurality of labels to verify that the generated error is not a known issue. The baseline code may be logically divided into a plurality of labels and the selected number of transactions may include all other transactions within a label that include the selected one of the plurality of transactions. The baseline code may be logically divided into a plurality of labels and the selected number of transactions may include all other transactions in other labels that include the selected one of the plurality of transactions. The selected metric may include file size and the generated error may include a file having a file size and the identifying step may identify the generated error as spurious when the selected number of errors includes files of a same or similar size as the size of the file of the generated error. The selected metric may include a hash and the generated error may include a file and the identifying step may identify the generated error as spurious when the selected number of errors includes files having hashes of a same or similar hash as the hash of the file of the generated error. The selected metric may include a text string, the generated error may include a file and the identifying step may identify the generated error as spurious when the selected number of errors includes files containing a text string that match a text string contained in the file of the generated error. A step of storing the generated error in a database that is accessible to the developers may also be carried out. The distributed code development environment may include a database configured to store the generated errors and the comparing step may include steps of accessing the database and retrieving therefrom the errors generated by the selected test on the selected number of the plurality of transactions.

According to another embodiment thereof, in a distributed code development environment that includes baseline code that is logically divided into a plurality of labels, each of the plurality of labels including a plurality of transactions authored by respective developers, a computer-implemented method for determining whether errors generated by a test of software code are intermittent or consistent may include a step of carrying out a selected test on a selected one of the plurality of labels, the selected test generating an error that represents an unsuccessful completion of the selected test. The generated error may then be compared against errors generated by the selected test on a selected number of the plurality of labels, and the generated error may be identified as intermittent in the baseline label if fewer than a selected number of errors generated by the selected test on the selected number of labels are identical or similar to the generated error by a selectable metric. The generated error may be identified as being consistent otherwise.

The selected metric may include file size, the generated error may include a file having a file size and the identifying step may identify the generated error as spurious when the selected number of errors includes files of a same or similar size as the size of the file of the generated error. The selected metric may include a hash, the generated error may include a file and the identifying step may identify the generated error as spurious when the selected number of errors includes files having hashes of a same or similar hash as the hash of the file of the generated error. Alternatively still, the selected metric may include a text string, the generated error may include a file and the identifying step may identify the generated error as spurious when the selected number of errors includes files containing a text string that match a text string contained in the file of the generated error. The method may further include a step of storing the generated error in a database that is accessible to the developers. The distributed code development environment may include a database configured to store the generated errors and the comparing step may include steps of accessing the database and retrieving therefrom the errors generated by the selected test on the selected number of the plurality of labels.

According to still another embodiment thereof, the present invention may also be viewed as a machine-readable medium having data stored thereon representing sequences of instructions which, when executed by a computing device in a distributed code development environment, causes the computing device to determine whether errors generated by a test of software code are spurious or real, the distributed code development environment including baseline code that is logically divided into a plurality of labels, each of the plurality of labels including a plurality of transactions authored by respective developers, by carrying out steps that may include carrying out a selected test on a selected one of the plurality of transactions, the selected test generating an error that represents an unsuccessful completion of the selected test; comparing the generated error against errors generated by the selected test on a selected number of the plurality of transactions, and identifying the generated error as spurious in the baseline code if a selected number of errors generated by the selected test on the selected number of transactions are identical or similar by a selectable metric to the generated error, and identifying the generated error as real otherwise.

The present invention, according to another embodiment thereof, is also a machine-readable medium having data stored thereon representing sequences of instructions which, when executed by a computing device in a distributed code development environment, causes the computing device to determine whether errors generated by a test of software code are spurious or real, the distributed code development environment including baseline code that is logically divided into a plurality of labels, each of the plurality of labels including a plurality of transactions authored by respective developers, by carrying out steps that may include carrying out a selected test on a selected one of the plurality of labels, the selected test generating an error that represents an unsuccessful completion of the selected test; comparing the generated error against errors generated by the selected test on a selected number of the plurality of labels, and identifying the generated error as spurious if a selected number of errors generated by the selected test on the selected number of labels are identical or similar by a selectable metric to the generated error, and identifying the generated error as real otherwise.

Another embodiment of the present invention is a computer system for determining whether errors generated by a test of software code are intermittent or consistent in a distributed code development environment that includes baseline code that is logically divided into a plurality of labels, each of the plurality of labels including a plurality of transactions authored by respective developers. Such a computer system may include at least one processor; at least one data storage device coupled to the at least one processor; a plurality of processes spawned by said at least one processor, the processes including processing logic for: carrying out a selected test on a selected one of the plurality of transactions, the selected test generating an error that represents an unsuccessful completion of the selected test; comparing the generated error against errors generated by the selected test on a selected number of the plurality of transactions, and identifying the generated error as intermittent if a selected number of errors generated by the selected test on the selected number of transactions are identical or similar by a selectable metric to the generated error, and identifying the generated error as consistent otherwise.

Still another embodiment of the present invention is a computer system for determining whether errors generated by a test of software code are spurious or real in a distributed code development environment that includes baseline code that is logically divided into a plurality of labels, each of the plurality of labels including a plurality of transactions authored by respective developers. The computer system may include at least one processor; at least one data storage device coupled to the at least one processor; a plurality of processes spawned by said at least one processor, the processes including processing logic for: carrying out a selected test on a selected one of the plurality of labels, the selected test generating an error that represents an unsuccessful completion of the selected test; comparing the generated error against errors generated by the selected test on a selected number of the plurality of labels, and identifying the generated error as spurious if a selected number of errors generated by the selected test on the selected number of labels are identical or similar by a selectable metric to the generated error, and identifying the generated error as real otherwise.

In a distributed code development environment that includes baseline code that is logically divided into a plurality of labels, each of the plurality of labels including a plurality of transactions authored by respective developers, another embodiment of a computer-implemented method for identifying spurious errors may include steps of identifying a plurality of transactions of at least one of the plurality of labels on which a selected test was previously run; comparing errors generated by the selected test carried out on the identified transactions with each other using a selected metric; and for each of the generated errors, identifying the generated error as spurious if a selected number of errors generated by the selected test on the selected number of transactions are identical or similar, according to a selectable metric, to the generated error, and identifying the generated error as real otherwise.

In a distributed code development environment that includes baseline code that is logically divided into a plurality of labels, each of the plurality of labels including a plurality of transactions authored by respective developers, still another embodiment of a computer-implemented method for identifying whether errors generated by a test of software code are intermittent or consistent, may include steps of carrying out a selected test on at least one of a selected number of the plurality of labels and a selected number of the plurality of transactions; comparing the results of the selected test, and identifying an intermittent error in the baseline label if a selected number of errors generated by the selected test on the selected number of labels are identical or similar to one another by a selectable metric.

DETAILED DESCRIPTION

Embodiments of the present invention include methods for identifying intermittent difs within a given code by looking at similar sets of code. This knowledge may then used, among other uses, 1) to triage errors encountered by transactions, and 2) to diagnose intermittent errors in the baseline label.

Figure 2:
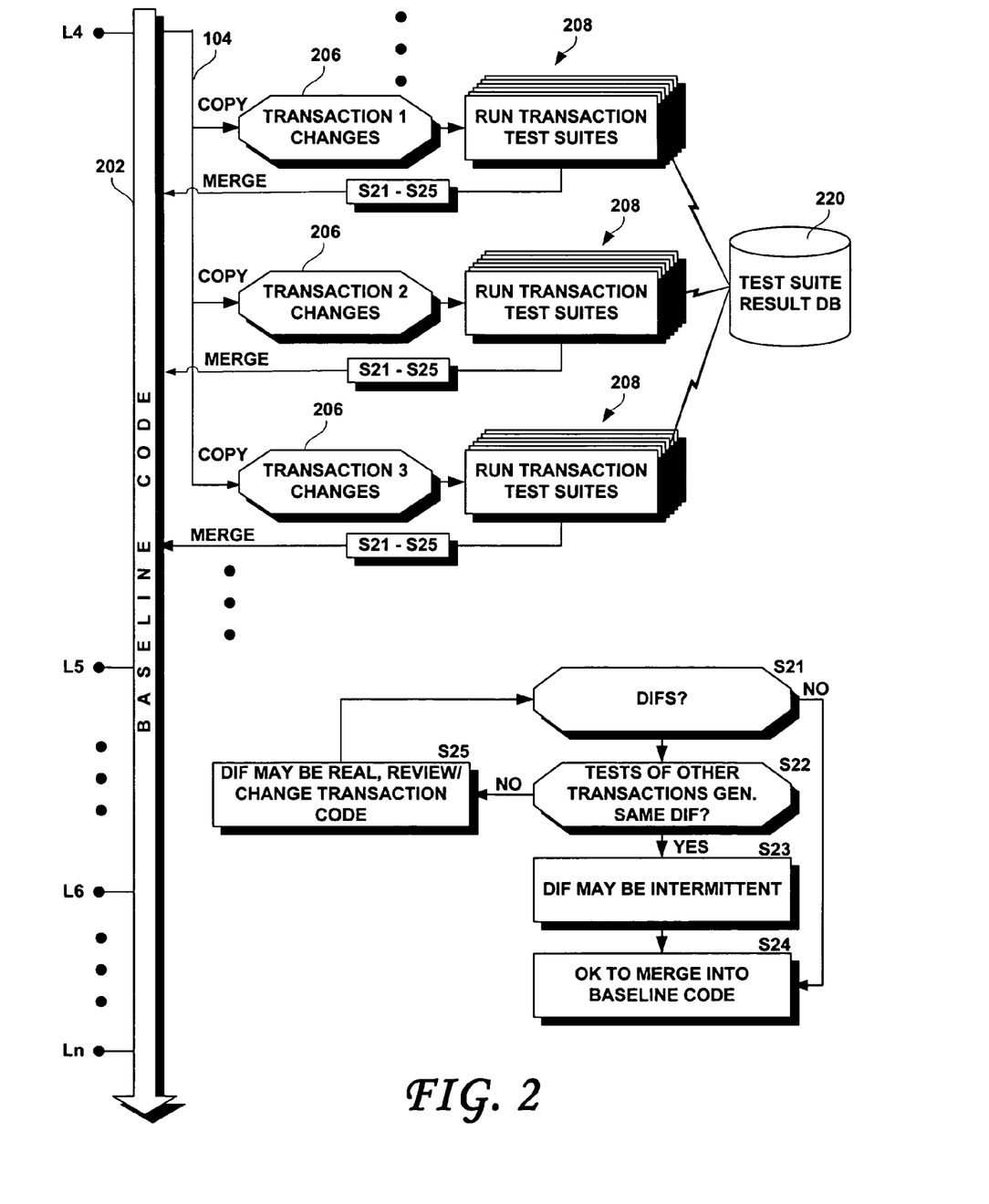
FIG. 2 is a representation of the baseline code over time and a method for testing transactions and determining whether transaction difs are real (non-intermittent, introduced by a transaction) or spurious (intermittent in the baseline code and independent of the transaction), according to an embodiment of the present invention.

FIG. 2 shows a representation of the baseline code over time and a method for testing transactions and determining whether transaction difs are real or spurious, according to an embodiment of the present invention. As shown, the baseline code is shown at 202. The baseline 202 may be logically divided into a plurality of labels (shown at L4-Ln in FIG. 2). The difference between any two labels may be only a single transaction or could be many transactions. It is to be noted, however, that embodiments of the present invention are not limited to the use of labels. Embodiments of the present invention may also be used within the context of continually updated baseline code in which no labels are defined, for example. Each label may incorporate the code from a number of transactions (transactions 206 numbered 1-3 are shown in FIG. 2), or from a single transaction. A plurality of transactions test suites 208 may be run on each of the transactions prior to merging them into the baseline code 202. Although the sets of tests run for each transaction may be different, there is normally sufficient overlap such that each test is executed multiple times. To evaluate and characterize the difs generated by these transaction test suites, an embodiment of the present invention calls for steps S21-25 to be carried out. At the outset, if no difs are encountered, the transaction may be safely merged into the baseline code, as indicated by steps S21 and S24. However, when difs are encountered upon running the transaction test suite as shown at S21, instead of running the test that generated the dif over and over again in an attempt to determine the rate of recurrence of the dif (or whether it re-occurs at all), an embodiment of the present invention calls for a determination as to whether (previously run) tests of other transactions generated the same dif, as shown at S22. In effect, this compares the test results of transactions to each other. If a test T has been run by N developers on transactions based off a given label of the baseline (or labels similar to it, such as ones before or after it), then when N is large (e.g., 10 or above), it is possible to discriminate spurious difs from ones caused by the underlying transaction code. The odds of another developer introducing a dif in their transaction that is exactly the same as the dif introduced by the transaction under test is believed to be very low, so matching difs in other transactions indicate a problem with the (development or testing) environment or baseline code. Even though the tests run by other developers on their own transactions may generate their own sets of difs caused by their changes to the baseline code, real difs may be discriminated from spurious difs because real difs are unlikely to be duplicated by two different sets of code changes. Therefore, the only difs that occur in multiple transactions are likely those that are unrelated to the developers' individual changes in their respective transactions. Therefore, step S25 calls for the developer to review and edit his or her code, only if none or few of the other polled transactions that ran this particular test generated the same dif (e.g., a dif of the same size as the dif under test, according to an embodiment of the present invention, although metrics other than file size may readily be used), as shown at S22. If, however, a selectable number or proportion or percentage of the other developers ran this particular test and obtained the same dif (e.g., a dif of the same size as the dif under test, or same hash or same text string, etc.) or a similar dif, the dif may be characterized as spurious (i.e., intermittent in the base label) and the transaction may be merged into the baseline code, as shown at S24.

Within this framework, if a developer runs a test T on his or her transaction and a dif is generated, two scenarios should be evaluated:

1) other developers got the same dif. If, for instance, 5 of 10 other developers got the same (or similar) dif, then this is likely an intermittent problem within the baseline, and can be ignored as a spurious dif, even if the test run on the baseline did not generate the dif.
2) no other developer got the same dif. Since the test run by other developers did not generate the same (or similar) dif, the dif is likely a real dif. The developer should feel confident in investing time and effort in its resolution without worrying that the dif was caused by factors independent of his or her code.

It may occur that by the time a test T finishes running on a transaction and generates a new dif, no other developer has yet run test T in a transaction on the label (e.g. if the developer started the run shortly after the label was released). In this case, as is the case according to an embodiment of the invention, there is still benefit in being able to compare against other transactions. Rather than resubmitting the test or investigating the dif manually, the developer may simply set the issue aside until such time (e.g. a few hours later) when other developers have run test T and be able to compare results at that time. In the duration, the developer may proceed in parallel on other, unrelated work. In this way, the developer still gains the full benefit of being able to compare against other transactions, without having to spend time investigating the dif, and without having to spend the much greater duration of waiting for multiple runs of the test T on his or her transaction.

It may be that a given test T is not frequently run by other developers, and that a larger pool for comparison is necessary. In this case, according to another embodiment of the invention, it is possible to query the results of transactions run on prior labels, for example up until the number N of runs of test T is found, or some predetermined cutoff in time is passed. Because baseline labels change gradually, if prior labels have had transactions that generated the same dif as the present transaction, this also indicates that a problem occurs in the label code or the environment. In this manner, it is possible to check the spuriousness of a dif even if the test that generated it was run only a few times on the present label, or not run at all on it.

A global script may be developed that compares all the results for a test T to determine if there is a pattern within the generated difs. If (as described above), test T fails with significant frequency (e.g. about half of the time), then it is likely an intermittent problem within the baseline code or environment. With this information, the intermittent problem can be caught as soon as it is introduced, rather than delayed until a baseline code test run encounters it. This allows the problem to be triaged (examined and assigned to a selected developer for resolution) much more effectively than if it were caught during testing of the baseline 202 (if it ever is caught, as the error that caused the dif may be very elusive or may only occur within transactions).

There is a range of automation that is possible when testing transactions. On the low end of automation and according to an embodiment of the present invention, the developer may run a command that is configured to compare the difs resulting from a test run on his or her transaction with the difs generated by the testing of other transactions. Again, if the same (or similar) dif is found a selectable number of times and/or in a selectable percentage of the other transactions, the developer may have increased confidence that the dif under test is spurious; i.e., one that was not caused by errors in the code of the transaction under test. However, this embodiment and approach requires significant work on the part of the developer to look at each dif and perform the comparison. On the higher end of the automation spectrum, and according to another embodiment of the present invention, a script may be generated to perform the comparisons, decide which difs are spurious and which are real, according to predefined and selectable metrics. However, this embodiment and approach may be subject to a higher than acceptable rate of false negatives or false positives. Developers, therefore, may wish somewhat greater control in the identification of spurious difs.

According to yet another embodiment of the present invention, an intermediate level of automation for the identification of intermittent difs may generate a summary for each dif that may show, for example, the number of times that the test that generated the dif under test was run by other developers, the rate at which other developers' runs of this test suite generated sucs and the number of difs (if any) that match the developer's dif under test. Thereafter, the developer may choose to look at individual difs in greater detail for those cases where the spuriousness of the error is uncertain; i.e., in those cases in which it is uncertain whether the dif is caused by the underlying code changes or may have been caused by factors that are independent of the developer's code that generated the dif under test. To facilitate comparison of difs across transactions, an embodiment of the present invention stores the testing results of each transaction in a test suite result database 220 that is accessible by other developers (most likely over a network). By querying this database, the developers may compare the difs stored over a selectable period of time (e.g., a day, a week or a month) with the dif under test in the manner above.

Figure 3:
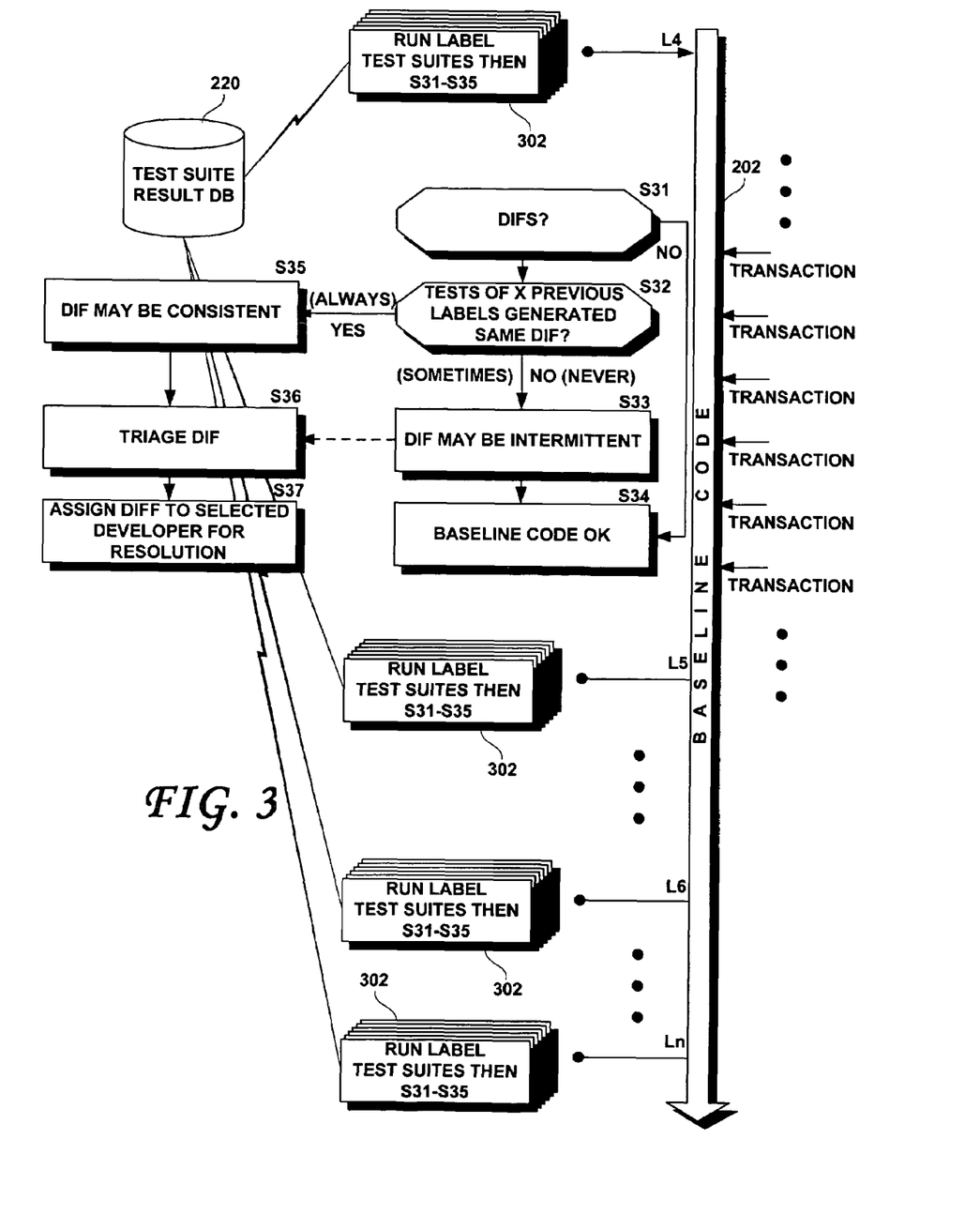
FIG. 3 is a representation of the baseline code over time and a method for testing baseline labels and determining whether label difs are intermittent or consistent, according to an embodiment of the present invention.

FIG. 3 shows a representation of the baseline code over time and a method for testing baseline labels and determining whether label difs are consistent or intermittent, and whether they have to do with the environment or errors in the code, according to an embodiment of the present invention. As shown therein, label test suites 302 are periodically run on the baseline code 202. Conventionally, when difs were encountered, the test that generated the dif would be repeated a number of times to determine whether the dif under test is again generated, and how many times the dif is generated. According to an embodiment of the present invention, however, the outputs (including at least the sucs and difs) of the test suites run on other labels on the baseline code 202 may be examined to determine if a selectable number of difs were generated that were identical (or similar) to the dif under test. In effect, this embodiment leverages the results of (previously or to be) executed tests to characterize the intermittent or consistent nature of the dif under test. Toward that end, the outputs of the label test suites may be stored in a database, such as test suite result database 220. The database 220 is preferably accessible to the developers to enable them to compare test results across not only transactions as shown in FIG. 2, but also across labels as shown in FIG. 3.

Specifically, when the label test suite generates a dif as shown at S31, rather than repeating the test over and over in an attempt to determine the spuriousness of the error, step S32 calls for a determination of whether a selectable number (X in FIG. 3) of previously run or to be run label test suites (and/or transaction test suites) generated the same or similar dif. If not, then the dif may have been caused by a one-time environment problem (e.g., if it never happens again) and undue time should not be spent investigating it, as indicated by S33 and S34. However, if a selectable number of such tests generated the same dif, the dif under test should be treated as a real problem with either the test or the code, as shown at S35. Conceptually, if previously run tests on other labels always generated the same dif, the underlining issue is most likely a consistent one. If previously run tests on other labels sometimes generated the same or similar dif, the issue may be an intermittent one. Lastly, if previously run tests never generated the same dif, the issue is likely a newly introduced dif, although it is possible that the issue may alternatively be an intermittent issue or a one-time environment problem. Examination of the dif may reveal the developer whose code is most likely the cause of the dif under test. This is the triage step of S36, after which the dif may be assigned to a selected one of the developers for further test and resolution, as called for by step S37.

Figure 4:
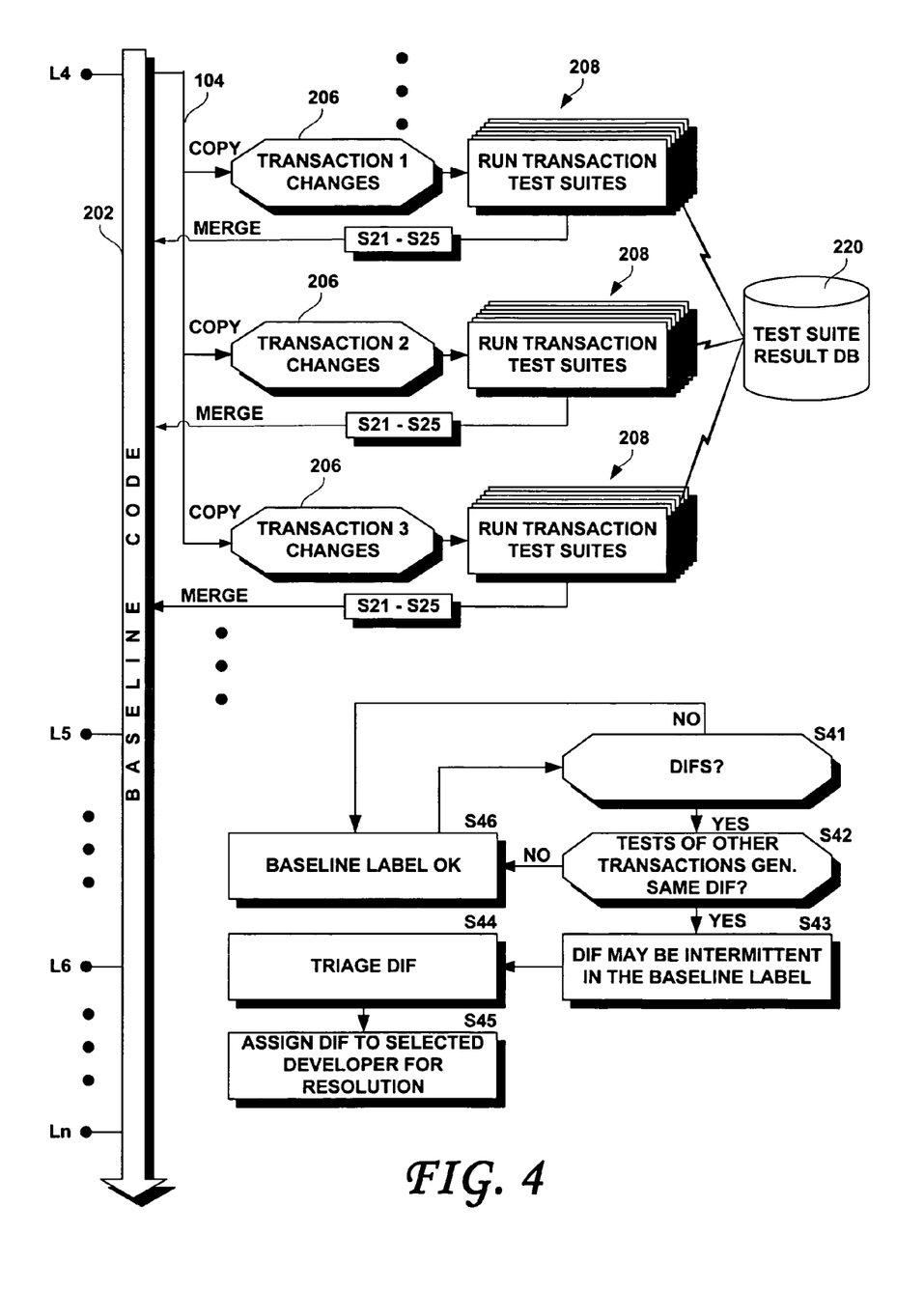
FIG. 4 is a representation of the baseline code over time and a method for identifying intermittent difs by looking at errors that occur sometimes but not always over a series of labels, according to an embodiment of the present invention.

FIG. 4 is a representation of the baseline code over time and a method for identifying intermittent difs by looking at errors that may occur—sometimes but not always—in transactions or labels over a series of labels, according to an embodiment of the present invention. FIG. 4 is similar to FIG. 2, but for steps S41-S46, described hereunder. If no difs are encountered, the baseline label remains OK as indicated by steps S41 and S46. However, when difs are encountered upon running the transaction test suite as shown at S41, instead of running the test that generated the dif over and over again in an attempt to determine the rate of recurrence of the dif, an embodiment of the present invention calls for a determination as to whether tests of (e.g., a large set of) other transactions generated the same dif, as shown at S42. If not, the baseline label is likely OK as shown at S46. If, however, it is determined that tests of other transactions generated the same dif (YES branch of S42), the dif may be intermittent in the baseline label as shown at S43. The dif should then be triaged as indicated at S44 and assigned to a selected developer for resolution, as shown at S45.

According to an embodiment of the present invention, a script may be run at selectable (e.g., regular) intervals on the baseline labels test results stored in the database 220. The results of this script may then be compared, to search for matches between the difs generated by the label test suites run on different labels. Based on the number and types of matches and parameters decided by the administrators, intermittent errors may be isolated and assigned to developers for resolution. This process may be customized to tolerate random errors, and optimized to not repeat work. In this way, errors in the baseline code can be more efficiently resolved.

The above method may further be extended to utilize tests run on transactions to find and triage intermittent difs on the label. In addition to using the tests run on the label, tests run on transactions may also be stored persistently in a centralized database. Just as in S23, a dif is determined to be worth investigating if it is encountered a significant number of times, but with this extension, transaction difs are also considered. In this way, it is possible to query many test results for each label instead of one. Although developers' transactions may be introducing difs of their own, if a given dif occurs commonly across a selectable number of transactions, it may be considered a problem with the baseline label, and investigated as such.

Embodiments of the present invention in effect poll previous test results and interpret the results thereof, thereby making it unnecessary to repeat most or all test runs on the transactions and/or baseline labels. In turn, this reduces the number and duration of testing runs needed between the end of the programming and the merging of the transactions into the baseline code 202. Embodiments of the present invention also reduce the developer's workload, reduce the machine cycles used to run the transaction and label tests, and reduce the delays experienced before changes may be made and incorporated back into the baseline. Since a test need not be repeated for the sole purpose of characterizing a dif as either spurious or real, it is more likely that a larger set of tests will be run, which consequently reduces the incidence of introduction of errors into the baseline code. Embodiments of the present invention may lessen the developers' stress, as the there now may be much less ambiguity between spurious and real difs, thereby allowing the developer to focus on code development instead of logistics.

Moreover, even if a test result on a baseline is missing, it may still be possible to triage the dif under test and to assign the dif to an appropriate developer, as test results on previous labels, developers' transactions, and developers' transactions on previous labels may be used in the triage process. Aspects of the present invention are well suited to software development management using farms of servers or grid-computing configurations, where a pool of computing resources is made available to the developer on demand.

In practice, a "showdiffs" command may be configured so as to access the database 220 and return with a comparison of the dif under test and the results of prior regression tests stored therein. The results of such a showdiffs command may be configured, for example, in either a summary or drill-down format. The summary format, for example, may return information regarding difs of a test or test suite and may be configured to return a number of parameters, such as, for example:

NWDIF The number of "new difs", which are difs that were not present in other transactions of a given label or labels.

SZDIF The number of "size difs" in the transaction under test. A "size dif" is a dif that is present in other transactions of a given label or labels but with a different file size. SZDIFs may not be counted in the NWDIF sum.

INTDIF The number of "intermittent difs" in the transaction under test. According to an embodiment of the present invention, an intermittent dif is a new dif that is present in at least one label of the baseline up to a predetermined number of days (e.g., 30) earlier than the transaction under test. INTDIFs may be counted in the NWDIF sum.

DIF The number of difs.

NWSUC The number of "new sucs", which are sucs that are present in the transaction under test but were not present in other transactions of a given label or labels.

SUC The number of sucs (i.e., passed tests).

The drill-down format may be configured so as to provide extensive test information. The drill-down format may be useful in tracking down intermittent difs across labels of the baseline code 202. For example, each dif of a test may be categorized into one of two categories. The first category may include those difs in which other transactions within the label also includes the dif, and the dif sizes (i.e., the size of the dif text file output as a result of running the test—other metrics may be used) match—which almost certainly indicates a spurious dif. No test history need be printed for these difs. A sample line of output for such a dif may be configured as follows:

OK tklrddlb.dif: size=11798: FAIL > ORA-01017: invalid username/password; logo

In this sample output, tklrddlb is the name of the test, the "size=" is the size of the dif text file output by the tklrddlb test, and "OK" signifies that no investigation is warranted. The text after the "size=" is the first line of the dif text file.

The second category may include those difs that require a full label test history, such as new difs and difs whose size does not match previous difs in the label. All such difs may be flagged with a "?" to indicate uncertainty. For illustrative purposes, an exemplary sample output for a new dif may be as follows:

| | | |
|---|---|---|
| ? tkamx384.dif: size=923, no baselabel dif: FAIL < ORA-00001: unique constra | | |
| tkamx384 | RDBMS_MAIN_021218 | [NOTRUN] |
| tkamx384 | RDBMS_MAIN_021220 | [SUC] |
| tkamx384 | RDBMS_MAIN_021223 | size 9440 |
| tkamx384 | RDBMS_MAIN_021224 | [SUC] |
| tkamx384 | RDBMS_MAIN_021226 | size 260 |
| tkamx384 | RDBMS_MAIN_021227 | [SUC] |
| tkamx384 | RDBMS_MAIN_021230 | [SUC] |
| tkamx384 | RDBMS_MAIN_021231 | [SUC] |
| tkamx384 | RDBMS_MAIN_030106 | [SUC] |
| tkamx384 | RDBMS_MAIN_030108.0002 | [SUC] |
| tkamx384 | (SZMATCH) RDBMS_MAIN_030109 | size 923 |
| tkamx384 | RDBMS_MAIN_030110.0001 | [SUC] |
| tkamx384 | RDBMS_MAIN_030113 | [SUC] |
| tkamx384 | RDBMS_MAIN_030114 | size 622 |
| tkamx384 | RDBMS_MAIN_030115 | [SUC] |
| tkamx384 | RDBMS_MAIN_030116 | size 260 |
| tkamx384 | RDBMS_MAIN_030117.0001 | size 371 |

In this exemplary output, the tkamx384 is the name of the test run against the transaction. The string "tkamx384.dif" is the filename of the error file generated by the tkamx384 test when run on the transaction. The "size=923" is the size, in bytes, of the tkamx384.dif text file. The entry "no baselabel dif" indicates that the label off which the transaction is based did not generate this dif. The "FAIL < ORA-00001: unique constra" represents the first line of the tkamx384.dif text file. The entries of the format RDBMS_MAIN_XXXXXX represent the label names of prior labels and may include, for example, the label's creation date in the XXXXXX field. "[NOTRUN]" means that this tkamx384 test was not run within the label. "[SUC]" means the test passed. "(SZ-MATCH)" means the tests failed (generated a dif), and the generated dif is the same size as the dif under test.

In the exemplary sample output above, there is one label RDBMS_MAIN_030109 in which the tkamx384 test generated a dif having a size that matches the size (923 bytes) of the dif under test, and multiple labels in which there are difs of various sizes. It is, therefore, possible that this dif is an intermittent dif in the label, but due to the lack of multiple matches, the dif is probably worth investigating.

The following exemplary sample out shows results for a dif that may be characterized as being intermittent in the label and therefore spurious within the context of the transaction testing:

| | | |
|---|---|---|
| ? tklrcp2a.c dif: size=1116, label size=612: FAIL > ORA-00904: C: invalid identi | | |
| tklrcp2a | RDBMS_MAIN_021216 | [NOTRUN] |
| tklrcp2a | RDBMS_MAIN_021217 | size 612 |
| tklrcp2a | (SZMATCH) RDBMS_MAIN_021218 | size 1116 |
| tklrcp2a | RDBMS_MAIN_021220 | [SUC] |
| tklrcp2a | (SZMATCH) RDBMS_MAIN_021223 | size 1116 |
| tklrcp2a | RDBMS_MAIN_021224 | [SUC] |
| tklrcp2a | (SZMATCH) RDBMS_MAIN_021226 | size 1116 |
| tklrcp2a | RDBMS_MAIN_021227 | size 612 |
| tklrcp2a | (SZMATCH) RDBMS_MAIN_021230 | size 1116 |
| tklrcp2a | RDBMS_MAIN_021231 | size 612 |
| tklrcp2a | (SZMATCH) RDBMS_MAIN_030106 | size 1116 |
| tklrcp2a | RDBMS_MAIN_030107 | [SUC] |
| tklrcp2a | (SZMATCH) RDBMS_MAIN_030108.0002 | size 1116 |
| tklrcp2a | RDBMS_MAIN_030109 | size 344 |
| tklrcp2a | (SZMATCH) RDBMS_MAIN_030110.0001 | size 1116 |
| tklrcp2a | (SZMATCH) RDBMS_MAIN_030114 | size 1116 |

-continued

| | | |
|---|---|---|
| tklrcp2a | (SZMATCH) RDBMS_MAIN_030115 | size 1116 |
| tklrcp2a | RDBMS_MAIN_030116 | [SUC] |
| tklrcp2a | RDBMS_MAIN_030117.0001 | [SUC] |

In this case, the test tklrcp2a was run on a number of labels and returned a dif having the exact size of the text file tklrcp2a.dif, the error file of the dif under test. Since a (selectable) number of labels generated the same dif, it is likely that the dif under test is not related to the underlying code that is currently being tested. The dif under test, therefore, may be characterized as being spurious.

The results of the showdiffs command may also be configured, for example, in a poll format. The poll format may be configured to be similar to the drill-down format, but the comparison may be based upon other transactions within a same label or multiple labels, instead of being based upon comparisons across tests run only on labels, as above. Such a poll format may help triage difs that occur only on the farm (or grid), or are intermittent, or ones for which the base label has not been run. However, caution should be exercised, as it is possible, albeit unlikely, for two or more transactions to cause the same error. Exemplary sample output for the poll format is shown below:

| | | |
|---|---|---|
| ? txmsebu2.dif: size=180, no baseline dif: FAIL > declare | | |
| txmsebu2 | RDBMS_MAIN_T67736 | [SUC] |
| txmsebu2 | RDBMS_MAIN_T67930 | [SUC] |
| txmsebu2 | (SZMATCH) RDBMS_MAIN_T67933 | size 180 |
| txmsebu2 | (SZMATCH) RDBMS_MAIN_T67938 | size 180 |
| txmsebu2 | (SZMATCH) RDBMS_MAIN_T67946 | size 180 |
| txmsebu2 | RDBMS_MAIN_T67953 | [SUC] |
| txmsebu2 | RDBMS_MAIN_T67959 | [SUC] |
| txmsebu2 | (SZMATCH) RDBMS_MAIN_T67962 | size 180 |
| txmsebu2 | RDBMS_MAIN_T67967 | [SUC] |
| txmsebu2 | RDBMS_MAIN_T67976 | [SUC] |
| txmsebu2 | RDBMS_MAIN_T68051 | [SUC] |
| txmsebu2 | (SZMATCH) RDBMS_MAIN_T68213 | size 180 |

The RDBMS_MAIN_TXXXXX is a number that uniquely identifies a transaction. In this case, it is likely that the dif under test is a spurious one, as it appears that this dif is affecting a significant number of other transactions within the label—although it did not occur in the test run for this label ("no baseline dif"). The threshold number, portion or percentage for determining whether a dif may be characterized as spurious may be freely selected to be as conservative or as liberal as desired. For example, the threshold for characterizing a dif as being intermittent in the baseline code may be, for example, 50% of the transactions (or labels) having generated the same dif as the dif under test.

The output of the showdiffs command may also be formatted to simply list concatenated results of a number of tests, and to give an indication of which of the generated difs are likely to be spurious. An exemplary output may have a format such as:

| DIF NAME | DIF TYPE | VOTES | VOTE SUC | VOTE DIF | VOTE SZMATCH |
|---|---|---|---|---|---|
| tktuutso.dif | unknown | 106 | 95 | 11 | 6 |
| tktumsmu.dif | newlint | 106 | 90 | 16 | 0 |
| watson.dif | unknown | 106 | 98 | 8 | 0 |

DIF TYPE may be "newlint", "size", or "unknown" (for example, when the test was not run on the label). "VOTES" may represent the number of transactions that ran this test in this label, "VOTE SUC" may represent the number of times this test was successful, "VOTE DIF" may represent the number of times this test failed, and "VOTE SZMATCH" is the subset of "VOTE DIF" where the dif was the same size as the dif under test. In the above sample, the dif whose error file output is tktuutso.dif is most likely spurious, but the difs that generated the output text files tktumsmu.dif and watson.dif should be further investigated.

The output of such a showdiffs command may be automated further by an analysis of the number of sucs or difs, thus letting the developer focus only on potential issues. This requires an administrator to set bounds on how many matches in labels or transactions indicate a spurious dif, and how many necessitate further investigation. An exemplary output may looks like this:

| LRG | DIFF | STATUS COMMENTS |
|---|---|---|
| lrg3bu | tile47v.dif | NEW checked 91 runs over 23 labels |
| lrg3b | tkle47b.dif | OK seen in 20 runs out of 177 runs over 23 labels |
| lrg3b | tkle47bb.dif | OK seen in label RDBMS_MAIN _030116 |

In this case, in the test suite "lrg3bu", the dif "tile47v.dif" needs to be investigated, the dif "tkle47b.dif" may be ignored as spurious because it was encountered in multiple other transaction test runs, and the dif "tkle47bb.dif" may be ignored as spurious because it occurred in a baselabel test run.

Figure 5:
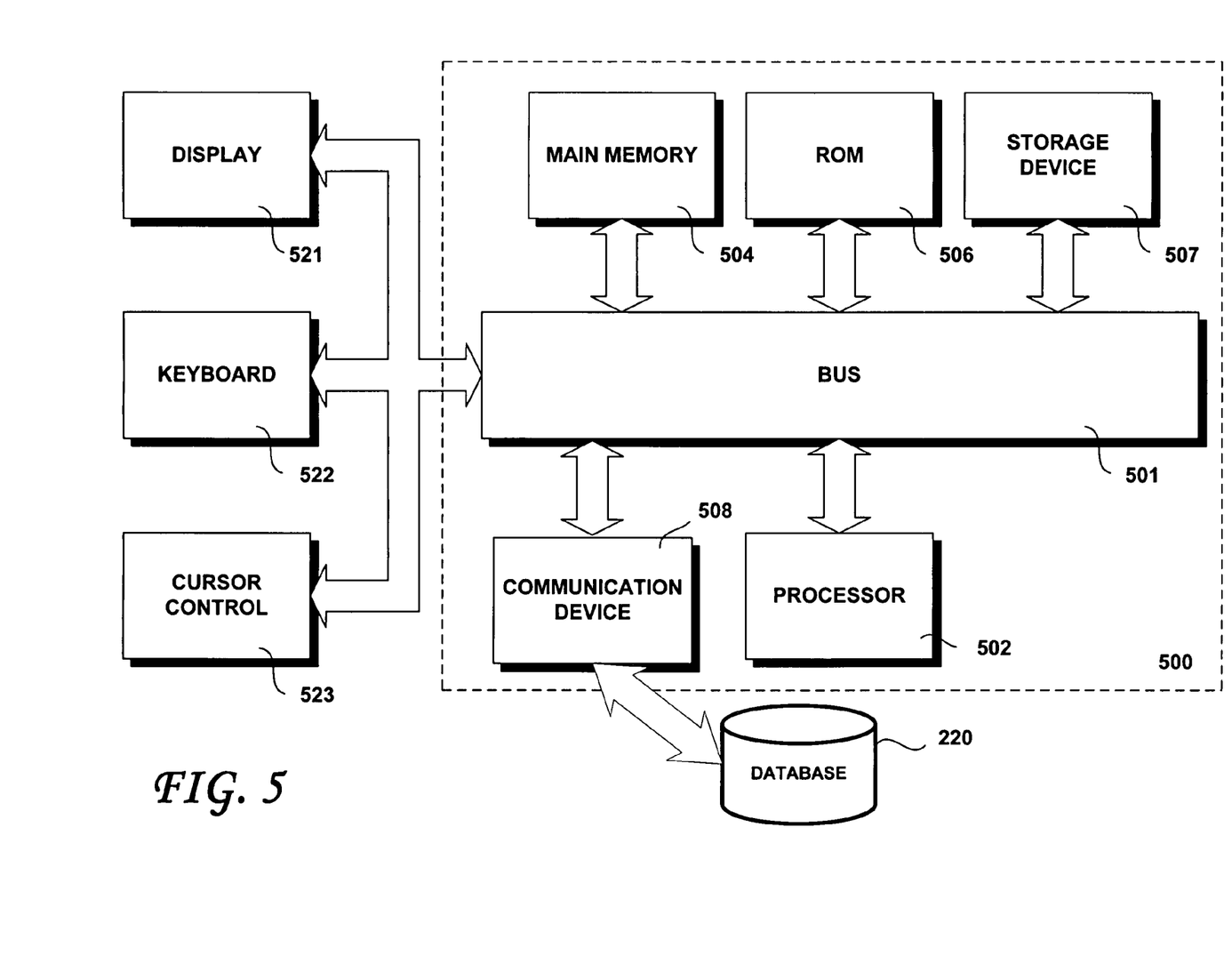
FIG. 5 is a block diagram of a computer with which embodiments of the present invention may be practiced.

FIG. 5 illustrates a block diagram of a computer system 500 upon which embodiments of the present inventions may be implemented. Computer system 500 includes a bus 501 or other communication mechanism for communicating information, and one or more processors 502 coupled with bus 501 for processing information. Computer system 500 further comprises a random access memory (RAM) or other dynamic storage device 504 (referred to as main memory), coupled to bus 501 for storing information and instructions to be executed by processor(s) 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions. The computer system 500 may also be coupled via the bus 501 to a display device 521 for displaying information to a computer user. An alphanumeric input device 522, including alphanumeric and other keys, is typically coupled to bus 501 for communicating information and command selections to processor(s) 502. Another type of user input device is cursor control 523, such as a mouse, a trackball, or cursor direction keys for communicating direction information and command selections to processor 502 and for controlling cursor movement on display 521. The computer system 520 may be coupled to a database 220 configured to store the difs generated by the testing of the labels and transactions.

Embodiments of the present invention are related to the use of computer system 500 and/or to a plurality of such computer systems to enable methods and systems for characterizing errors in code or difs as either spurious or real (in the case of transactions) or intermittent or consistent in nature (in the case of baseline labels). According to one embodiment, the methods and systems described herein may be provided by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the steps and have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. In a distributed code development environment that includes baseline code that includes a plurality of transactions authored by respective developers, a computer-implemented method for determining whether errors generated by a test of software code are spurious or real, the method comprising:
   carrying out a selected test with one or more processors associated with a set of one or more computer systems on a selected one of the plurality of transactions, the selected test generating an error that represents an unsuccessful completion of the selected test;
   verifying with the one or more processors associated with the set of one or more computer systems that the error that represents an unsuccessful completion of the selected test is not a known issue;
   comparing, with the one or more processors associated with the set of one or more computer systems, the error that represents an unsuccessful completion of the selected test against errors previously generated by the selected test on a selected number of other ones of the plurality of transactions, the errors previously generated by the selected test also representing unsuccessful completions of the selected test; and
   generating, with the one or more processors associated with the set of one or more computer systems, information identifying the error that represents an unsuccessful completion of the selected test as spurious based on a determination in response to the comparing that a selected number of errors previously generated by the selected test on the selected number of transactions are identical or similar by a selectable metric to the error that represents an unsuccessful completion of the selected test, and generating information identifying the error that represents an unsuccessful completion of the selected test as real otherwise.

2. The computer-implemented method of claim 1, wherein the baseline code is logically divided into a plurality of labels, each of the plurality of labels including a plurality of transactions and wherein verifying with the one or more processors associated with the set of one or more computer systems that the error that represents an unsuccessful completion of the selected test is not a known issue comprises comparing, with the one or more processors associated with the set of one or more computer systems, the results of the error that represents an unsuccessful completion of the selected test against the result of the selected test on at least one of the plurality of labels to verify that the error that represents an unsuccessful completion of the selected test is not a known issue.

3. The computer-implemented method of claim 1, wherein the baseline code is logically divided into a plurality of labels and wherein the selected number of transactions includes all other transactions within a label that includes the selected one of the plurality of transactions.

4. The computer-implemented method of claim 1, wherein the baseline code is logically divided into a plurality of labels and wherein the selected number of transactions includes all other transactions in other labels that include the selected one of the plurality of transactions.

5. The computer-implemented method of claim 1, wherein the selected metric includes file size and wherein the error that represents an unsuccessful completion of the selected test includes a file having a file size and wherein the error that represents an unsuccessful completion of the selected test is identified as spurious by the one or more processors associated with the set of one or more computer systems when the selected number of errors includes files of a same or similar size as the size of the file of the error that represents an unsuccessful completion of the selected test.

6. The computer-implemented method of claim 1, wherein the selected metric includes a hash and the error that represents an unsuccessful completion of the selected test includes a file and wherein the error that represents an unsuccessful completion of the selected test is identified as spurious by the one or more processors associated with the set of one or more computer systems when the selected number of errors includes files having hashes of a same or similar hash as the hash of the file of the error that represents an unsuccessful completion of the selected test.

7. The computer-implemented method of claim 1, the selected metric includes a text string and wherein the error that represents an unsuccessful completion of the selected test includes a file and wherein the error that represents an unsuccessful completion of the selected test is identified as spurious by the one or more processors associated with the set of one or more computer systems when the selected number of errors includes files containing a text string that match a text string contained in the file of the error that represents an unsuccessful completion of the selected test.

8. The computer-implemented method of claim 1, further comprising storing the error that represents an unsuccessful completion of the selected test in a database that is accessible to the developers.

9. The computer-implemented method of claim 1, wherein the distributed code development environment includes a database configured to store the generated errors and wherein comparing, with the one or more processors associated with the set of one or more computer systems, the error that represents an unsuccessful completion of the selected test against errors previously generated by the selected test on a selected number of other ones of the plurality of transactions comprises:
   accessing the database; and
   retrieving therefrom the errors generated by the selected test on the selected number of the plurality of transactions.

10. In a distributed code development environment that includes baseline code that is logically divided into a plurality of labels, each of the plurality of labels including a plurality of transactions authored by respective developers, a computer-implemented method for determining whether errors generated by a test of software code are intermittent or consistent, the method comprising:

carrying out with one or more processors associated with a set of one or more computer systems a selected test on a selected one of the plurality of labels, the selected test generating an error that represents an unsuccessful completion of the selected test;

comparing, with the one or more processors associated with the set of one or more computer systems, the error that represents an unsuccessful completion of the selected test against errors previously generated by the selected test on a selected number of other ones of the plurality of labels, the errors previously generated by the selected test also representing unsuccessful completions of the selected test; and generating, with the one or more processors associated with the set of one or more computer systems, information identifying the error that represents an unsuccessful completion of the selected test as intermittent in the baseline label based on a determination in response to the comparing that fewer than a selected number of errors previously generated by the selected test on the selected number of labels are identical or similar to the error that represents an unsuccessful completion of the selected test by a selectable metric, and generating information identifying the error that represents an unsuccessful completion of the selected test as consistent in the baseline label otherwise.

11. The computer-implemented method of claim 10, wherein the selected metric includes file size and wherein the error that represents an unsuccessful completion of the selected test includes a file having a file size and wherein the error that represents an unsuccessful completion of the selected test is identified as intermittent in the baseline label by the one or more processors associated with the set of one or more computer systems when the selected number of errors includes files of a same or similar size as the size of the file of the error that represents an unsuccessful completion of the selected test is identified.

12. The computer-implemented method of claim 10, wherein the selected metric includes a hash and the error that represents an unsuccessful completion of the selected test is identified includes a file and wherein error that represents an unsuccessful completion of the selected test is identified as intermittent in the baseline label by the one or more processors associated with the set of one or more computer systems when the selected number of errors includes files having hashes of a same or similar hash as the hash of the file of the error that represents an unsuccessful completion of the selected test.

13. The computer-implemented method of claim 10, the selected metric includes a text string and wherein the error that represents an unsuccessful completion of the selected test is identified includes a file and wherein error that represents an unsuccessful completion of the selected test is identified as intermittent in the baseline label by the one or more processors associated with the set of one or more computer systems when the selected number of errors includes files containing a text string that match a text string contained in the file of the error that represents an unsuccessful completion of the selected test.

14. The computer-implemented method of claim 10, further comprising storing the error that represents an unsuccessful completion of the selected test in a database that is accessible to the developers.

15. The computer-implemented method of claim 10, wherein the distributed code development environment includes a database configured to store the generated errors and wherein comparing, with the one or more processors associated with the set of one or more computer systems, the error that represents an unsuccessful completion of the selected test against errors previously generated by the selected test on a selected number of other ones of the plurality of labels comprises:

accessing the database; and retrieving therefrom the errors generated by the selected test on the selected number of the plurality of labels.

16. A machine-readable storage medium having data stored thereon representing sequences of instructions which, when executed by a computing device in a distributed code development environment, causes the computing device to determine whether errors generated by a test of software code are spurious or real, the distributed code development environment including baseline code that is logically divided into a plurality of labels, each of the plurality of labels including a plurality of transactions authored by respective developers, the machine-readable storage medium comprising:

instructions for carrying out a selected test on a selected one of the plurality of transactions, the selected test generating an error that represents an unsuccessful completion of the selected test;

instructions for verifying that the error that represents an unsuccessful completion of the selected test is not a known issue;

instructions for comparing the error that represents an unsuccessful completion of the selected test against errors previously generated by the selected test on a selected number of other ones of the plurality of transactions, the errors previously generated by the selected test also representing unsuccessful completions of the selected test; and instructions for generating information identifying the error that represents an unsuccessful completion of the selected test as spurious in the baseline code based on a determination in response to the comparing that a selected number of errors previously generated by the selected test on the selected number of transactions are identical or similar by a selectable metric to the generated error, and generating information identifying the error that represents an unsuccessful completion of the selected test as real otherwise.

17. A machine-readable storage medium having data stored thereon representing sequences of instructions which, when executed by a computing device in a distributed code development environment, causes the computing device to determine whether errors generated by a test of software code are intermittent or consistent, the distributed code development environment including baseline code that is logically divided into a plurality of labels, each of the plurality of labels including a plurality of transactions authored by respective developers, the machine-readable storage medium comprising:

instructions for carrying out a selected test on a selected one of the plurality of labels, the selected test generating an error that represents an unsuccessful completion of the selected test;

instructions for comparing the error that represents an unsuccessful completion of the selected test against errors previous generated by the selected test on a selected number of other ones of the plurality of labels, the errors previously generated by the selected test also representing unsuccessful completions of the selected test; and instructions for generating information identifying the error that represents an unsuccessful completion of the selected test as intermittent in the baseline label based on a determination in response to the comparing that a selected number of errors previously generated by the selected test on the selected number of labels are identical or similar by a selectable metric to the error that represents an unsuccessful completion of the selected test, and generating information identifying the error that represents an unsuccessful completion of the selected test as consistent in the baseline label otherwise.

18. A computer system for determining whether errors generated by a test of software code are intermittent or consistent in a distributed code development environment that includes baseline code that is logically divided into a plurality of labels, each of the plurality of labels including a plurality of transactions authored by respective developers, the computer system comprising:
- at least one processor;
- at least one data storage device coupled to the at least one processor;
- a plurality of processes spawned by said at least one processor, the processes including processing logic for:
- carrying out a selected test on a selected one of the plurality of transactions, the selected test generating an error that represents an unsuccessful completion of the selected test;
- comparing the error that represents an unsuccessful completion of the selected test against errors previously generated by the selected test on a selected number of other ones of the plurality of transactions, the errors previously generated by the selected test also representing unsuccessful completions of the selected test; and
- generating information identifying the error that represents an unsuccessful completion of the selected test as intermittent in the baseline label based on a determination in response to the comparing that a selected number of errors previously generated by the selected test on the selected number of transactions are identical or similar by a selectable metric to the error that represents an unsuccessful completion of the selected test, and generating information identifying the error that represents an unsuccessful completion of the selected test as consistent in the baseline label otherwise.

19. A computer system for determining whether errors generated by a test of software code are spurious or real in a distributed code development environment that includes baseline code that is logically divided into a plurality of labels, each of the plurality of labels including a plurality of transactions authored by respective developers, the computer system comprising:
- at least one processor;
- at least one data storage device coupled to the at least one processor;
- a plurality of processes spawned by said at least one processor, the processes including processing logic for:
- carrying out a selected test on a selected one of the plurality of labels, the selected test generating an error that represents an unsuccessful completion of the selected test;
- verifying that the error that represents an unsuccessful completion of the selected test is not a known issue;
- comparing the error that represents an unsuccessful completion of the selected test against errors previously generated by the selected test on a selected number of other ones of the plurality of labels, the errors previously generated by the selected test also representing unsuccessful completions of the selected test; and
- generating information identifying the generated error as spurious based on a determination in response to the comparing that a selected number of errors previously generated by the selected test on the selected number of labels are identical or similar by a selectable metric to the error that represents an unsuccessful completion of the selected test, and generating information identifying the error that represents an unsuccessful completion of the selected test as real otherwise.

20. In a distributed code development environment that includes baseline code that is logically divided into a plurality of labels, each of the plurality of labels including a plurality of transactions authored by respective developers, a computer-implemented method for identifying spurious errors, the method comprising:
- loading at least one transaction of the plurality of transactions onto a computer;
- selecting a test and using the computer to run the selected test on the loaded at least one transaction;
- identifying using the computer a plurality of transactions of at least one of the plurality of labels on which the selected test was previously run;
- comparing, with the computer, errors previously generated by the selected test carried out on the identified transactions with errors generated by the test run on the loaded at least one transaction using a selected metric;
- for each of the errors generated by the test run on the loaded at least one transaction, generating information with the computer identifying the errors generated by the test run on the loaded at least one transaction as spurious based on a determination in response to the comparing that a selected number of errors previously generated by the selected test on the selected number of transactions are identical or similar, according to a selectable metric, to the errors generated by the test run on the loaded at least one transaction, and generating information identifying the errors generated by the test run on the loaded at least one transaction as real otherwise.

21. In a distributed code development environment that includes baseline code that is logically divided into a plurality of labels, each of the plurality of labels including a plurality of transactions authored by respective developers, a computer-implemented method for identifying whether errors generated by a test of software code are intermittent or consistent, the method comprising:
- loading at least one label of the plurality of labels onto a computer;
- using the computer, carrying out a selected test on the at least one loaded label and on a selected number of the plurality of transactions of the loaded label;
- comparing, with the computer, errors generated by the selected test on the at least one loaded label with previously generated errors of the selected test on other ones of the plurality of labels and the plurality of transactions; and
- generating, with the computer, information identifying an intermittent error in the at least one loaded label based on a determination in response to the comparing that a selected number of errors previously generated by the selected test on other ones of the plurality of labels are identical or similar to errors generated by the selected test on the at least one loaded label by a selectable metric.

* * * * *

UNITED STATES PATENT AND TRADEMARK OFFICE
CERTIFICATE OF CORRECTION

| | | |
|---|---|---|
| PATENT NO. | : 7,712,087 B2 | Page 1 of 1 |
| APPLICATION NO. | : 11/169455 | |
| DATED | : May 4, 2010 | |
| INVENTOR(S) | : David Kogan et al. | |

It is certified that error appears in the above-identified patent and that said Letters Patent is hereby corrected as shown below:

Title Page;
On the face page, in field (56), in column 2, under "Other Publications", line 4, delete ""Softward" and insert -- "Software --, therefor.

On page 2, in column 1, under "Other Publications", line 1-2, delete "Managment" and insert -- Management --, therefor.

On page 2, in column 2, under "Other Publications", line 2, delete ""Softward" and insert -- "Software --, therefor.

On page 2, in column 2, under "Other Publications", line 2, delete "Managment" and insert -- Management --, therefor.

In column 12, line 52, delete "? tklrcp2a.c dif: size=" and insert -- ? tklrcp2a.dif: size= --, therefor.

In column 18, line 60, in claim 17, delete "previous" and insert -- previously --, therefor.

Signed and Sealed this
Ninth Day of August, 2011

David J. Kappos
*Director of the United States Patent and Trademark Office*